United States Patent
Hashizume et al.

(10) Patent No.: US 7,687,768 B2
(45) Date of Patent: Mar. 30, 2010

(54) MECHANICAL JOINT HAVING OPTICAL INTERCONNECTION

(75) Inventors: Kenichi Hashizume, Gunma (JP); Kaoru Tanaka, Tokyo (JP)

(73) Assignee: Nokia Corporation, Espoo (FI)

( * ) Notice: Subject to any disclaimer, the term of this patent is extended or adjusted under 35 U.S.C. 154(b) by 315 days.

(21) Appl. No.: 11/818,343

(22) Filed: Jun. 13, 2007

(65) Prior Publication Data

US 2008/0308755 A1    Dec. 18, 2008

(51) Int. Cl.
- *H01J 40/14* (2006.01)
- *G06M 7/00* (2006.01)
- *G06F 3/033* (2006.01)

(52) U.S. Cl. .................. 250/239; 250/221; 345/161
(58) Field of Classification Search .................. 250/239, 250/221, 22.1, 553, 214.1, 216, 222.1; 345/161–166
See application file for complete search history.

(56) References Cited

U.S. PATENT DOCUMENTS

| | | | |
|---|---|---|---|
| 3,790,155 A | * | 2/1974 | Longamore .................. 269/60 |
| 4,570,065 A | * | 2/1986 | Pryor ..................... 250/559.33 |
| 5,237,459 A | * | 8/1993 | Strauss ........................ 359/863 |
| 6,470,132 B1 | | 10/2002 | Nousiainen et al. ......... 385/146 |
| 2003/0087610 A1 | | 5/2003 | Ono ............................ 455/90 |
| 2004/0105329 A1 | | 6/2004 | Lin et al. .................... 365/202 |

FOREIGN PATENT DOCUMENTS

| | | |
|---|---|---|
| JP | 8046385 (A) | 2/1996 |
| JP | 2006140815 (A) | 6/2006 |
| JP | 2006309574 (A) | 11/2006 |
| JP | 2007142567 (A) | 6/2007 |
| WO | WO 03/009008 A2 | 1/2003 |
| WO | WO 2006/092978 A1 | 9/2006 |

* cited by examiner

*Primary Examiner*—Georgia Y Epps
*Assistant Examiner*—Don Williams
(74) *Attorney, Agent, or Firm*—Harrington & Smith, Attorneys at Law, LLC (57) ABSTRACT

A mechanical joint having at least first and second joint elements arranged in contact with each other. A first surface of the first joint element abuts a second surface of the second joint element and is at least partially provided with at least one optically emitting module. The respective abutting second surface of the second element is provided, at least in part, with at least one optically receiving module.

42 Claims, 6 Drawing Sheets

MECHANICAL JOINT HAVING OPTICAL INTERCONNECTION

FIELD OF THE INVENTION

The present invention is related to mechanical joint or hinge connections in electronic devices, and in particular to joint connection elements with integrated optical interconnection.

BACKGROUND ART

Many electronic devices, such as telecommunication devices or computing devices are provided with a number of separate foldable or pivotable subcomponents in order to easily change the appearance and/or size of a device. For example, foldable mobile phones with a clamshell configuration are very popular. Other examples are laptops and personal digital assistants (PDA), media players with or without separate displays, cameras and many more. In most of these, functional elements are present in several separate parts of the device. A main device component including a processor or similar elements may have one or more additional components foldably attached, such as a display screen or a keyboard, or e.g. a protecting cover with a signaling display. In some devices, the folding configuration may determine the current functionality of a device.

At the connecting regions or edges of two separate device parts, one or more hinges or joint elements may be provided for moving those device parts relative to each other. When data transfer is required between the separate device parts, for example in order to display data provided by the processing component, a data interconnection between those movable parts is necessary. However, due to the extensive movement and stress on these connecting joint elements during use, it is difficult to integrate a durable and reliable signal connection path into the connecting element. At the same time, the number of required signal connection paths increases with the complexity of available device functions, such as movie players with foldable high-resolution displays.

Cables and wires threaded through holes or tubes at the connecting elements may be damaged by the repeated movement and edge friction. They also limit the degrees of freedom for moving and folding the device parts with respect to each other, since e.g. a wire cannot be twisted infinitely without risking a cable break. While two-directional hinge constructions such as a folding hinge with swivel are possible with such a cable (e.g. a micro coaxial cable), this still does not allow movements in arbitrary directions, and in addition assembly of the device parts is complicated significantly. For allowing sufficient mobility, a combination of multiple hinges for several directions of movement is usually necessary. Another solution which is sometimes used in foldable or collapsible devices is to use flexible printed circuits (FPC) inside a hinge structure. FPCs may be rolled or multi-layered. Still, flexible printed circuits are subject to restrictions in flexibility due to their two-dimensional basic shape. The degree of freedom for a hinge assembled with a FPC interconnection between device parts is limited to only one direction, with a limited rotation angle.

SUMMARY OF THE INVENTION

Thus, a connecting joint is provided, the joint having at least first and second joint elements arranged in contact with each other, wherein a first surface of said first joint element abutting at a second surface of said second joint element is at least partially provided with at least one optically emitting module, and said respective abutting second surface of said second element is provided at least partially with at least one optically receiving module.

In some embodiments of the invention, said optically emitting module is an organic light emitting diode. Similarly, the optically receiving module may in some embodiments be an organic photodiode. Alternatively, the optically receiving module may be a pin-photodiode. In further embodiments, the optically emitting module may be a vertical cavity surface emitting laser. In this way, an optical data connection between the arranged joint elements may be achieved in any joint position without the need of any actual mechanical interconnections or cables.

According to exemplary embodiments of the invention the first element surface may be covered with said optically emitting module at least on any surface region which contacts said second element surface in any relative joint position.

Similarly, in exemplary embodiments the said second element surface may be covered with said optically receiving module at least on any surface region which contacts said first element surface in any relative joint position.

The joint may in some embodiments be a ball-and socket joint. In exemplary embodiments, the first element may be a ball element and the second element may be a socket element enclosing said ball element at least in part, or vice versa, i.e. the first element may be the socket element and the second element may be the ball element.

Optionally, the joint may comprise a lubricant provided between said contact surfaces of said first and second elements.

Further, in some embodiments at least a part of said surfaces being covered with optically emitting and/or receiving modules is provided with an optically transparent protective layer. In some embodiments the protective layer may only be transparent for the wavelengths emitted by said optically emitting module. For example, the protective layer may comprise an acrylic resin coating.

The first and second joint elements may in further exemplary embodiments comprise first and second nested cylindrical elements, wherein said first cylindrical element is an inner element and said second cylindrical element is an outer element.

In some embodiments, the cylindrical elements each may have a connecting rod which extends substantially orthogonal to the cylinder axis.

Optionally, said outer cylindrical element has a partial circumferential opening of at least the width of said connecting rod of said inner element.

In another exemplary embodiment, said first and second cylindrical elements are arranged to allow a piston movement substantially parallel to the cylinder axis.

The first and second joint elements may be at least partially hollow in some embodiments, and at least one cable may be threaded through both of said joint elements. The cable may be a detachable electrical connection.

In some embodiments of the invention, said optically emitting module is capable of emitting at least two different wavelengths of light. For example, said optically emitting module may comprise at least two superimposed layers of organic light emitting diodes. Also, the optically receiving module may in some embodiments be capable of receiving at least said two different wavelengths of light. This may for example be achieved by said optically receiving module comprising at least two superimposed layers of organic light emitting diodes. In exemplary embodiments said optically emitting module may be connected to a wavelength multiplexer.

According to embodiments of the invention, said optically receiving module and/or said optically emitting module comprises a single connected module unit. Alternatively, said optically receiving module and/or said optically emitting module may comprise at least two separate module units. Then, the joint may further comprise in some embodiments a synchronizer connected to said separate module units for synchronizing optical signals transmitted via said module.

Furthermore, a joint module is provided which may in exemplary embodiments comprise one or more mechanical joints as described above combined together. For example, a joint module may include one or more ball and socket joints as mentioned above.

In a joint module, the joint elements may in exemplary embodiments be arranged within a common plane.

Furthermore, an electronic device is provided comprising at least two separate parts connected in at least one area, wherein said connection is provided by a mechanical joint as described above. The electronic device may for example be one of the group of: a mobile phone, a laptop computer, a personal digital assistant, a navigation system, a media player.

Moreover, a method is proposed for providing an optical data interconnection at a mechanical joint element, the method comprising providing first and second joint elements for allowing a movement of said joint elements relative to each other when arranged together, wherein a first contact surface of said first joint element at least partially abuts on a second contact surface of said second joint element; providing said first contact surface of said first joint element at least partially with an optically emitting module; and providing said second contact surface of said second joint element at least partially with an optically receiving module.

The providing of an optically emitting module may in some embodiments include coating the surface with an organic light emitting diode, and/or the providing of an optically receiving module may include coating the surface with an organic photodiode.

Furthermore, in some embodiments the method may further comprise coating at least one of said contact surfaces with a protecting material. The protecting material may be translucent at least at the wavelength(s) of said optically emitting module. As an example, the protecting material may be an acrylic resin coating.

Optionally, the method may further include introducing a lubricant in between said first and second contact surfaces.

BRIEF DESCRIPTION OF FIGURES

In the following, the invention will be described in more detail by way of exemplary embodiments and with reference to the appended figures, in which.

It shall be noted that all of the examples shown in figures and described in more detail are merely intended to illustrate the inventive idea, and the invention is in no way limited to these arrangements and examples.

DETAILED DESCRIPTION OF EXEMPLARY EMBODIMENTS

Figure 1:
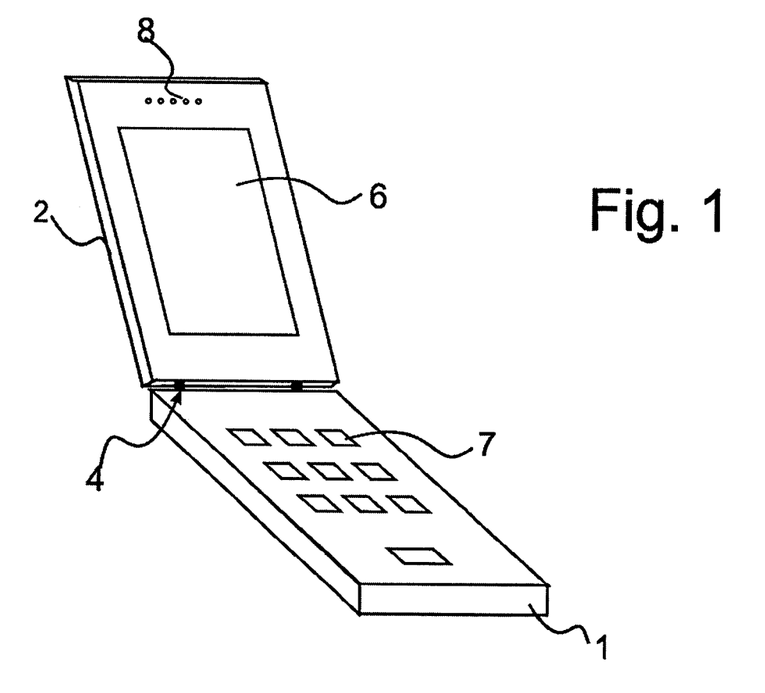
FIG. 1 shows an exemplary device in which embodiments of the invention may be used.

FIG. 1 shows an example of a device that may apply various exemplary embodiments of the invention. The device may be a foldable mobile phone, i.e. a so-called clamshell or flip phone. Such a device may typically consist of two separate device parts 1, 2 which are movably connected along a single edge. Functional elements may be distributed in various ways on or in these device parts. In the example shown, the lower main device part 1 includes a keypad or keyboard 7 for data input by a user. A processor (not shown) may be included in the main part as well as wireless communication modules such as antennas, receivers, transmitters, encoders, amplifiers and further elements. The upper device part 2, which is foldably attached to the main part 1, may for example include a display screen 6 and a loudspeaker 8. Data produced or received at the main part 1 thus may have to be transferred to the hinged upper device part 2 for display or acoustical output. The edge connection between the device parts 1 and 2 may in the present example include any kind of hinge or joint element 4 that will allow a flipping or folding motion.

While this example shows a foldable phone having two parts, the invention is of course not limited to such a device. A device may include more than two parts which may be connected in similar or different ways, such as device parts connected by a swivel joint or a ball joint for obtaining full rotational movements between these parts. In other exemplary devices, two smaller elements may be folded on different edges to a single larger element. Connection elements such as joints and hinges may also be combined in any suitable way to achieve a desired flexibility.

Devices that may apply embodiments of the invention for connecting device parts may also be other electronic device types, such as laptops and palm top computers with foldable display elements; foldable keyboards; display screens for any kind of media device such as video players; navigation systems and many more. The person skilled in the art will easily consider a multitude of other devices and gadgets which may benefit from a hinge or joint element with signal interconnection capability. Also, the functional elements present on these devices and the applications which require a signal connection between device parts are not limited to those described in the present example, but rather may include all kind of operating elements, processing elements and signaling elements which may be used within electronic devices. Further examples for functional elements included are LEDs or other optical signaling elements; sensors of various kinds such as temperature, optical, acoustical or motion sensors; active and passive electronic circuits; touch screens; vibrating elements; volatile or non-volatile memory elements, e.g. hard disks, integrated flash memory elements, or memory cards; antennas, receiver/transmitters for wireless or wired communication; and many other functional elements known in the art.

Figure 2A:
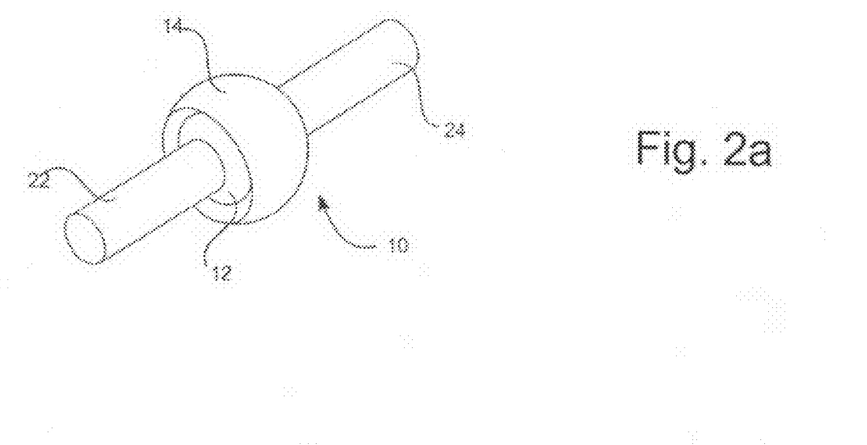
FIG. 2 shows a ball joint element as one exemplary embodiment of the invention

FIG. 2a is a schematic depiction of a first exemplary embodiment of the invention. A ball-and-socket joint is used for explanatory purposes here, but the general idea of the invention applies similarly to any other kind of hinge or joint, and in particular to all embodiments described within this document. The figure shows a ball joint element 10 that may be used to mechanically connect two separate device parts 1, 2. A ball joint will allow a maximum of flexibility and facilitates movements of the joined device parts in all directions with respect to each other. The ball element 12 is arranged movably within the socket element 14. The extent of the socket element 14 surrounding the ball element 12 when installed together may be chosen arbitrarily, depending on the motional freedom that shall be obtained for the hinge/joint. A rather closed socket structure will limit the obtained angle of motion between device parts, while an open socket structure would allow wider angles.

To obtain a signal interconnection between separate joint elements 12, 14 and thus between separate device parts, optical signal transmission is proposed according to the invention. In exemplary embodiments, at least parts of the overlapping surfaces of both joint elements 12, 14 are provided with an optical receiver module and an optical transmitter module, respectively. In order to ensure the feasibility of data transfer at any relative position of the joint, at least one of the joint elements is largely covered with an optical module on the surface overlapping with the other joint surface. Suitable candidates for covering even curved surfaces such as a ball or cylinder element are e.g. organic optical modules, such as an organic light emitting diode (OLED) as an optical transmitter and organic photodiodes (OPD) as receivers. The organic modules may be applied to the surfaces by a coating process. In one exemplary embodiment, a first one 12 of the joint elements 12, 14 may be provided with an OLED region 16. The second joint element 14 may then be covered with an OPD region 18 as a counterpart. In some embodiments, the first and/or second joint elements may be covered completely by OLEDs or OPDs, while in others, only a certain part of the joint surface is covered, e.g. all surface parts that may come into contact with the respective overlapping surface of the joint counterpart element when moving may be covered with optically active modules.

Figure 2B:
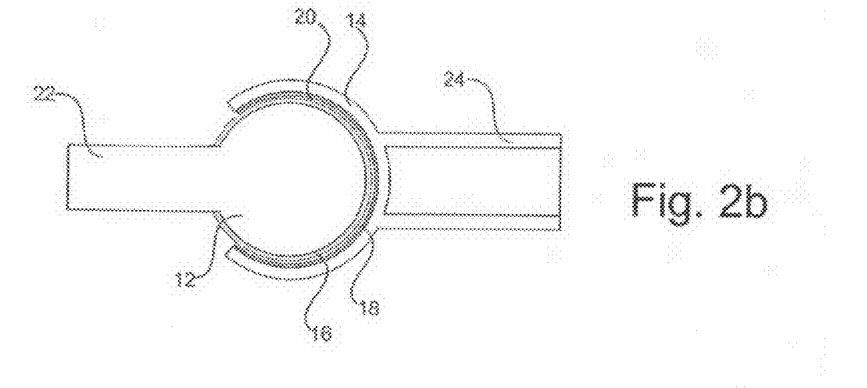

In FIG. 2b, a schematic cross section of an exemplary ball joint 10 according to an embodiment of the invention is shown. The ball element 12 is on one side provided with a protrusion 22 which allows a connection of the hinge or joint 10 to a device part. In this example, a cylindrical rod 22 is shown for this purpose, but the shape of this element is not essential and may be designed in any suitable way for a secure connection and according to the desired freedom of motion of the ball joint. A similar rod element 24 is formed at the socket element 14 in order to connect the second device part. These rod elements may be hollow or alternatively solid. A hollow element may result in a lower weight and less material to be used; also, further elements may be included within the structure, such as wires or other electronic components.

The socket element 14 of the ball joint encloses the corresponding ball element 12 to a certain degree. In the example of FIG. 2b the socket element covers more than half of the ball element surface, which ensures that the two joint elements will not disassemble. The relative size of the two counterpart elements 12, 14 may be selected such that a smooth movement of the joint is achieved, without too much play which would result in decreased joint stability, but also with enough clearance to avoid damage of the joint surfaces when moving. As mentioned above, the contact surface of one of the two joint elements 12, 14 is at least partially provided with optically emitting module(s) such as organic LEDs 16, while the facing surfaces of the other joint element is covered with compatible optical receivers such as organic photodiodes 18. The optical modules are depicted as shaded regions in FIG. 2b. It will be understood that the opposite configuration is equivalent, i.e. the ball element may be provided with the receiving photodiodes 18 and the socket element with the emitting diode structure 16. Not shown in FIGS. 2a and 2b are the device parts or components which are to be connected to each other by the ball joint elements 12, 14. These may be fixedly attached at the ends of the joint elements, or also be formed as a single part with the joint elements extending from the actual device parts in any suitable way. At the optically emitting end of the joint or hinge, a driver circuit may be connected to the emitting module (e.g. the OLED), such that data can be transferred by optical switching. The data may be received at the driver circuit e.g. from a processor or an input module. Similarly, a converter circuit may be connected to the receiving module on the second joint element in order to transform the received optical signals into electrical signals for further processing.

In between the two moving joint elements, a lubricant may be introduced in order to ease joint movement and to prevent damage of the optical layer(s) at the friction surfaces. A small gap 20 may be provided between the elements for this purpose, as shown in the cross-section of FIG. 2b. For a permanent mechanical surface protection, the optical receiver/transmitter surfaces of the joint elements may in some embodiments be covered partially or completely with a translucent material, i.e. essentially transparent for the respective optical wavelength(s) used for data transmission at the joint. The translucent material (not shown) may comprise a coating applied to at least the optical surface elements 16, 18 or even the complete joint element. As an example, an acrylic resin coating may be utilized for this purpose, but the person skilled in the art will easily find further materials suitable for protecting the optical elements at the joint surfaces. Coating materials and coated areas may also be selected such that stray light of undesired wavelengths (e.g. visible spectrum) is partially or completely filtered/blocked, while the OLED wavelength (e.g. infrared or a defined visible wavelength) is transmitted through the coating material. Different coating materials may optionally be chosen for the two joint elements 12 and 14. Both the lubricant and/or the protective coating of joint elements may naturally be used in connection with any embodiment of the invention, although explained here for the ball joint example.

Figure 2C:
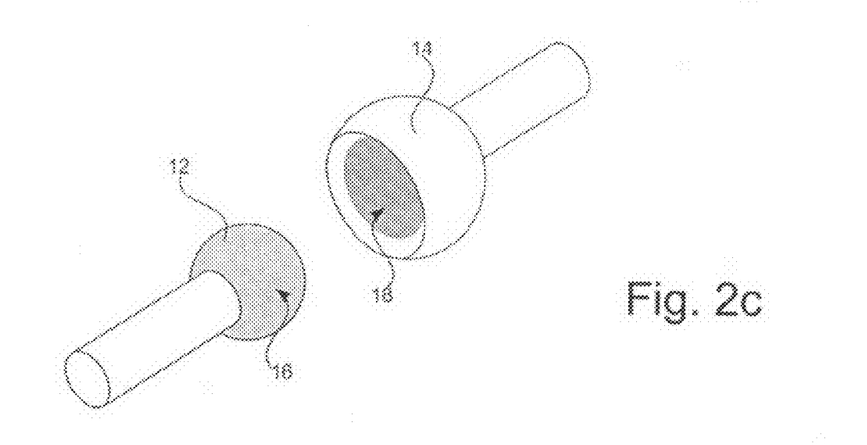

In FIG. 2c, the two joint elements 12 and 14 of an exemplary ball joint embodiment are depicted separately for illustrative purposes. The complete joint elements 12, 14 may be covered with the optical modules 16, 18 (either receiving or emitting, e.g. either OPD or OLED), shown in the figure as shaded areas. In some embodiments, the module areas may be optimized such that not the complete joint surface is covered, but only some areas selected such that a direct optical connection between the two facing joint surfaces is achieved in any possible joint position. In other embodiments, it may be desired to have an optical data connection only in certain relative device positions. For example, if a connection to a display screen shall only be maintained in an open position, the arrangement of the optical modules 16, 18 on the corresponding joint surfaces may be chosen such that in a closed folding position no direct contact between optical modules is made, and thus data is not transmitted.

Further exemplary embodiments may provide an area of OLED or OPD on a first one of the joint element surfaces, and a conventional optical element such as a pin-photodiode or a VCSEL (vertical cavity surface emitting laser) on the corresponding second joint element surface. As long as one of the surfaces is covered more or less completely with optical modules, an optical connection will be achieved in any arbitrary joint position with only one optical module (or a small number of modules), which may thus be provided in the form of non-organic single modules. Since the obtained directions of movement of a joint are easily derivable, the arrangement of optical modules at the surface may be optimized; however, the regular photodiode or LED/VCSEL may be located anywhere at the joint element. When regular photodiodes and/or LEDs are used, these may simply be integrated within the joint element, e.g. the ball or socket element, such that the top surface of the optical module is in one plane with the remaining joint surface and does not protrude beyond the surrounding surface area. For the optically emitting module, any kind of OLEDs (or other LEDs) may be used. In particular, various wavelengths, various manufacturing methods and/or materials are conceivable.

The OLED/OPD area 16, 18 may consist of one single unit or alternatively of multiple separate units arranged as desired. When several units are used, a synchronizer or equalizer may be provided in connection with the OLED and OPD units for synchronizing the data transfer across the complete optical module. In another exemplary embodiment of the invention, a layered structure of OLEDs and/or OPDs may be provided. With each layer, a different operation wavelength may be emitted, which allows an easy implementation of wavelength division multiplexing for data transmission. A controller and similar elements known in the art may be attached to the different layers in order to perform the multiplexing and de-multiplexing at the emitting and receiving sides.

Figure 3A:
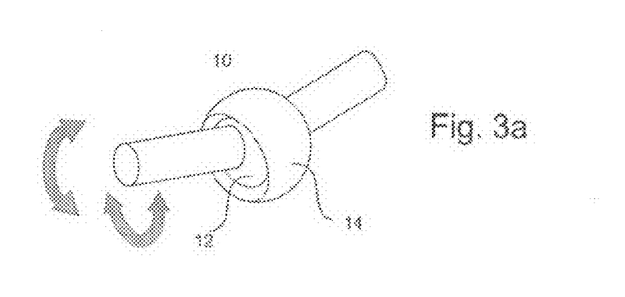
FIG. 3 shows various exemplary combinations of ball joints according to the invention and the resulting degrees of freedom.
Figure 3B:
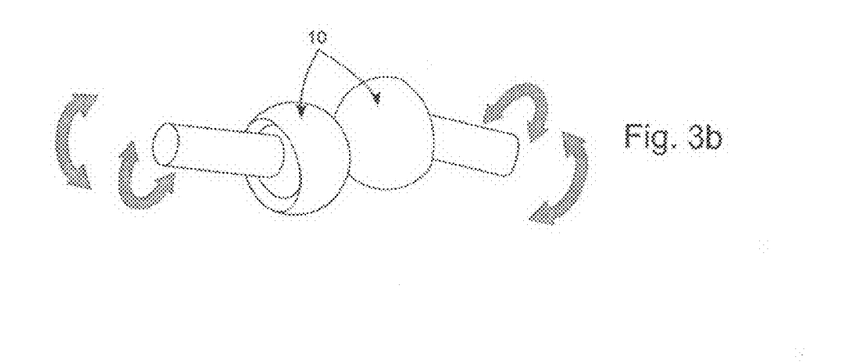
Figure 3C:
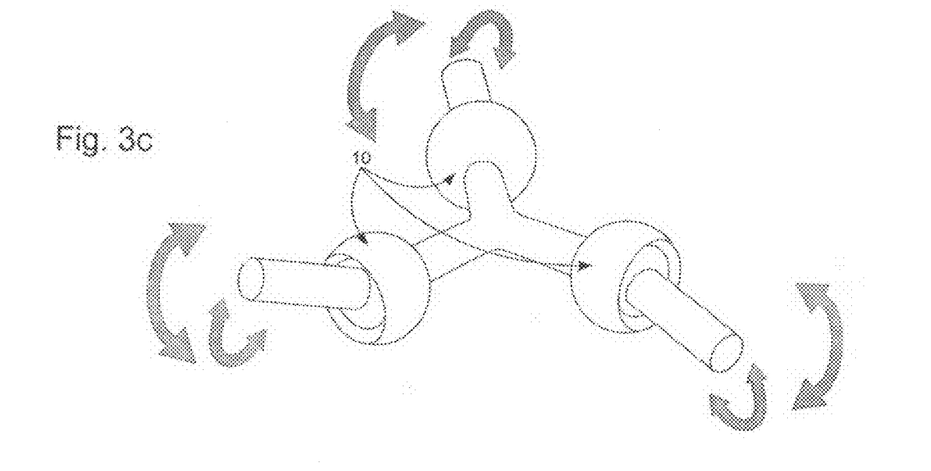

In FIG. 3a, the ball joint 10 of FIG. 2 is shown once more. As can be seen from the arrows giving the potential directions of movement, a ball joint will allow almost any folding or pivoting motion between to joined device component. A signal connection is ensured at all times, both during movement and at any stationary joint position, due to the proposed optical joint surfaces. The ball joint facilitates both rotational movements and linear movements in any arbitrary direction. Also, several revolutions of the joint elements may be performed while maintaining the data connection. When even more flexibility is desired for two or more device components, a number of ball-and-socket joints 10 as shown may be combined to form a very flexible joint structure. Examples are shown in FIGS. 3b and c. Although the joint elements are shown in a linear connection in FIG. 3b, or in a symmetrical radial arrangement in a single plane in FIG. 3c, the joint elements may also be arranged in other ways. For example, an orthogonal arrangement of three ball joints is conceivable. Also, the length and shape of the connecting rods between elements is arbitrary. In other embodiments, further functional elements of any size may be connected between two joint/hinge elements, if desired. Again, some exemplary combined joint modules have been shown for the ball joint example, but similar combinations may be arranged from other types of joints, such as the rod-clamp hinges or piston cylinder hinges described below. Also, different joint types may be combined in order to obtain a specific folding behavior for a device.

Figure 4A:
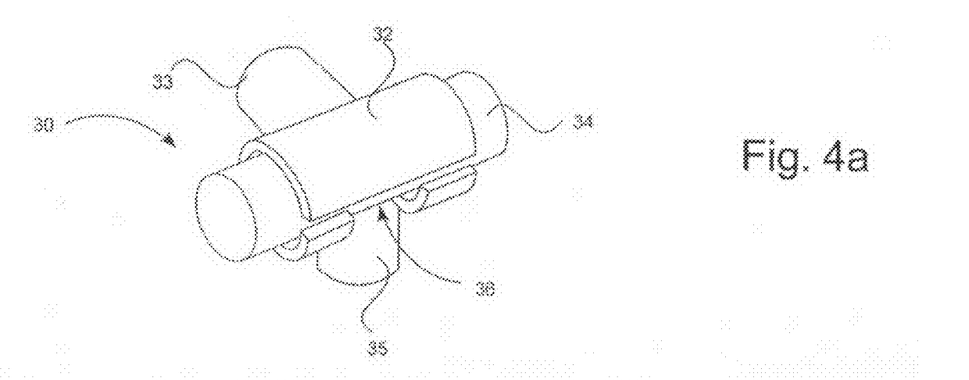
FIG. 4 depicts another exemplary embodiment in the form of a rod-clamp structure.

FIG. 4 presents a hinge structure according to another exemplary embodiment of the invention. The joint or hinge element 30 of FIG. 4a is arranged in a rod-clamp structure, i.e. a first cylindrical (rod) element 34 is enclosed by a second cylindrical element (clamp) 32. Connecting rods 33, 35 for the device parts to be hinged may extend from both of the cylindrical elements 32, 34 in an orthogonal direction. Then, an opening 36 in the outer cylinder 32 of approximately the width of the inner cylinder's connecting rod 35 will define the achievable angle of rotation of the hinge element 30. A wider opening may alternatively or additionally facilitate a sliding movement in a longitudinal direction, i.e. parallel to the cylinder axis of the two joint elements 32, 34. As in the ball joint example, the overlapping surfaces are at least partially covered with optically emitting and receiving modules 38, 39.

Figure 4B:
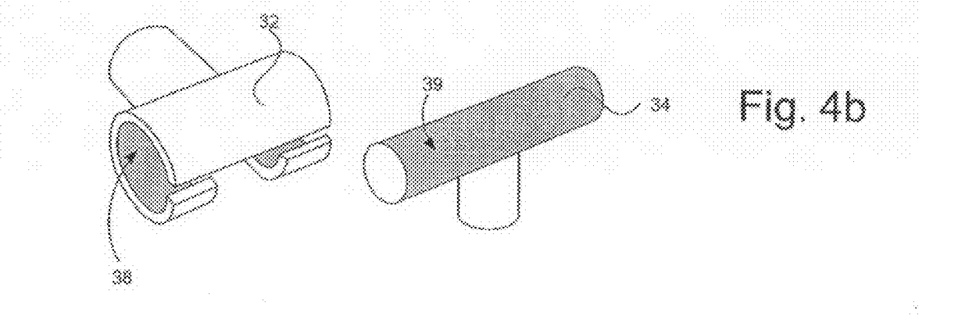

The two joint/hinge elements 32 and 34 are shown disassembled in FIG. 4b. When the inner cylinder element is provided on its outer surface 39 with an optically emitting module such as an OLED, the inner surface 38 of the second cylinder element shall be provided with corresponding OPDs (or other receiving modules) in order to allow signal connections in any relative device position. Of course, the reverse configuration may be applied similarly, with OLEDs provided on the inner surface 38 of the outer clamp cylinder element 32, and receiving OPDs arranged on the outside 39 of the first cylinder element 34.

Figure 5A:
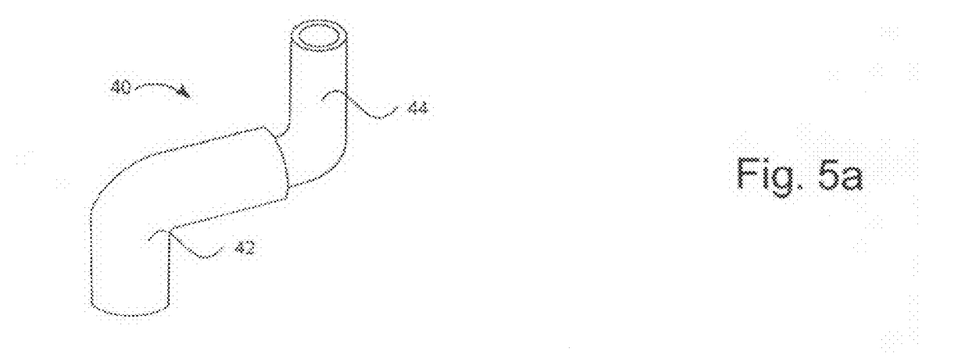
FIG. 5 is a joint variant with angled configuration according to another exemplary embodiment of the invention.
Figure 5B:
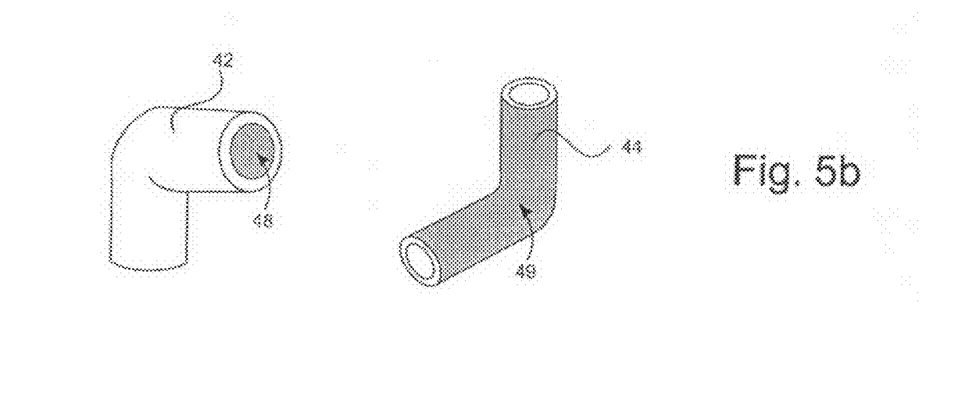

FIG. 5a shows a similar hinge structure 40 having two cylindrical elements 42 and 44, with the cylinders' radii again selected such that a first one 44 may be inserted into the second one 42. While in the example of FIG. 4, orthogonal connection rods were attached to the hinge cylinders, in this case the device connection may be provided by the extension of the two cylinder elements 42, 44 themselves. As in the previous examples, one of the two joint elements is covered with an optically emitting module such as an OLED at the contact surface of the hinge, and the other joint element is covered with the corresponding receiver module such as OPDs. The optically emitting and/or receiving surface regions are shown as shaded areas in FIG. 5b. Which of the joint elements is provided with what kind of optical modules will depend on the desired data transfer direction.

Figure 6A:
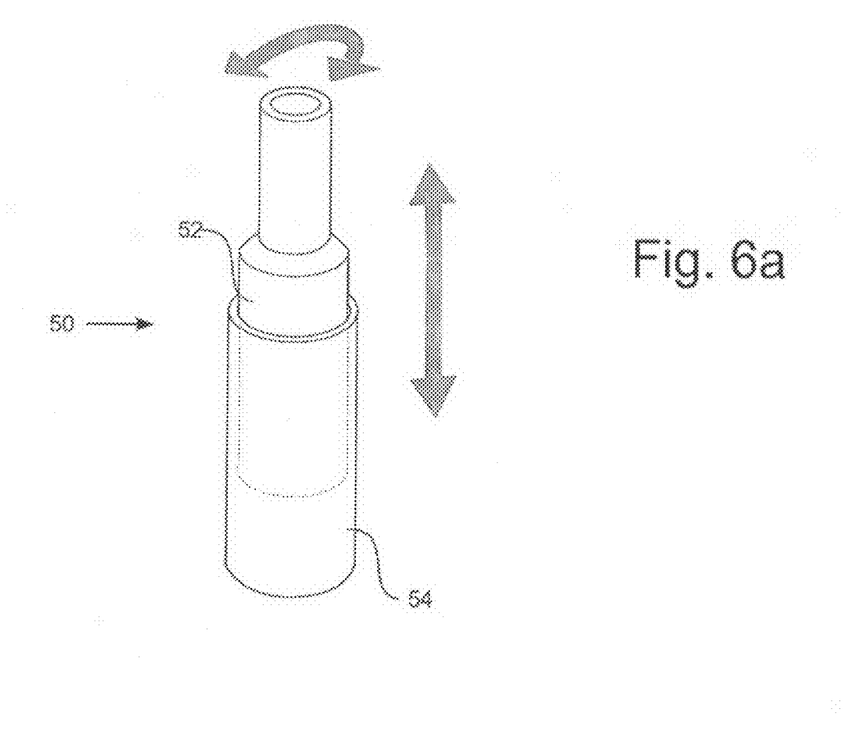
FIG. 6 is a cylindrical piston structure in another exemplary embodiment of the invention.
Figure 6B:
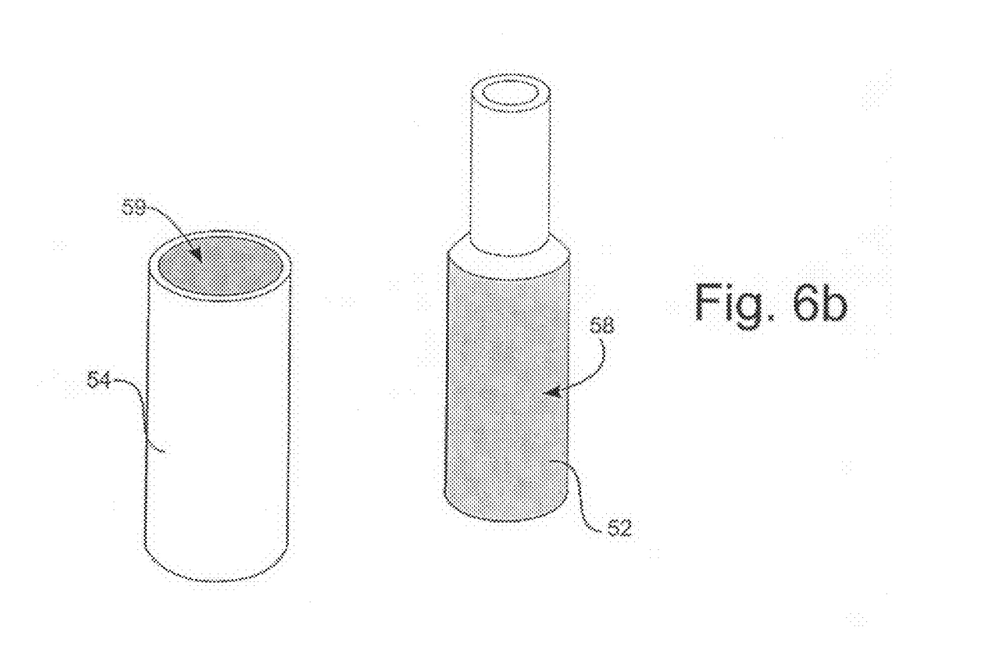

In FIG. 6, another example structure 50 according to the invention is shown which allows a piston-like movement in a linear direction parallel to the longitudinal joint axis. Again, an outer cylinder is provided as a first joint element 54, and an inner cylinder is fitted into the outer cylinder as a second joint element 52. The inner cylinder 52 may then be moved in and out of the outer joint element 54. In addition, a full rotational movement of the two elements relative to each other is possible. The contacting outer and inner cylinder surfaces 58 and 59 may, similar to the previous embodiments, be covered with optically emitting modules on one of the cylinders and optically receiving modules on the counterpart element, such that a optical connection between the separate joint elements is provided in all piston positions.

In the above described exemplary embodiments, a unidirectional optical connection is obtained by providing a first one of the joint elements with an optically transmitting structure and the counterpart element with a receiving structure. In further embodiments, bidirectional signal connection may be obtained by e.g. providing two separate hinge elements at a device edge with optical modules in opposite ways. That is, a first hinge may provide a signal connection path to the attached device component, and a second hinge connected to the same device component may then provide a signal connection path back from the device component to the main component. In this case, the arrangement of OPDs and OLEDs at the first and second joint elements would simply be inverted at the second hinge compared to the first hinge.

Another option for obtaining bidirectional connection, or more generally several different signal paths, is to divide the optical module surface into separate areas. This is in particular an option for linear hinge elements, such as the rod-clamp hinge structure described above. In this example, one half of the inner rod element may be covered with emitting optical module(s) such as OLEDs, while the remaining half of the rod surface may be covered with receiving OPDs. At the clamp counterpart element, corresponding optical modules are then provided by covering the area which will abut on the OLED covered surface during use with OPDs, and the remaining surface with OLEDs. In this way, one portion of the joint element allows an "uplink" connection from the main device component to the additional device part, while the remaining portion allows the opposite "downlink" connection. More complicated segmentations of the optically emitting and receiving surface areas are also conceivable. As has been described above, the arrangements of optical modules on the joint/hinge surfaces may be chosen such that a connection is only maintained in certain relative device positions. Thus, surfaces may also be covered with optical modules in a way that allows an uplink connection in a first folding configuration, and a downlink connection in a second folding configuration. However, bidirectional data communication is not always required; for example, displays and speakers located at a separate device part may only necessitate unidirectional data transmission from the main (processing) component to the output component.

Figure 7:
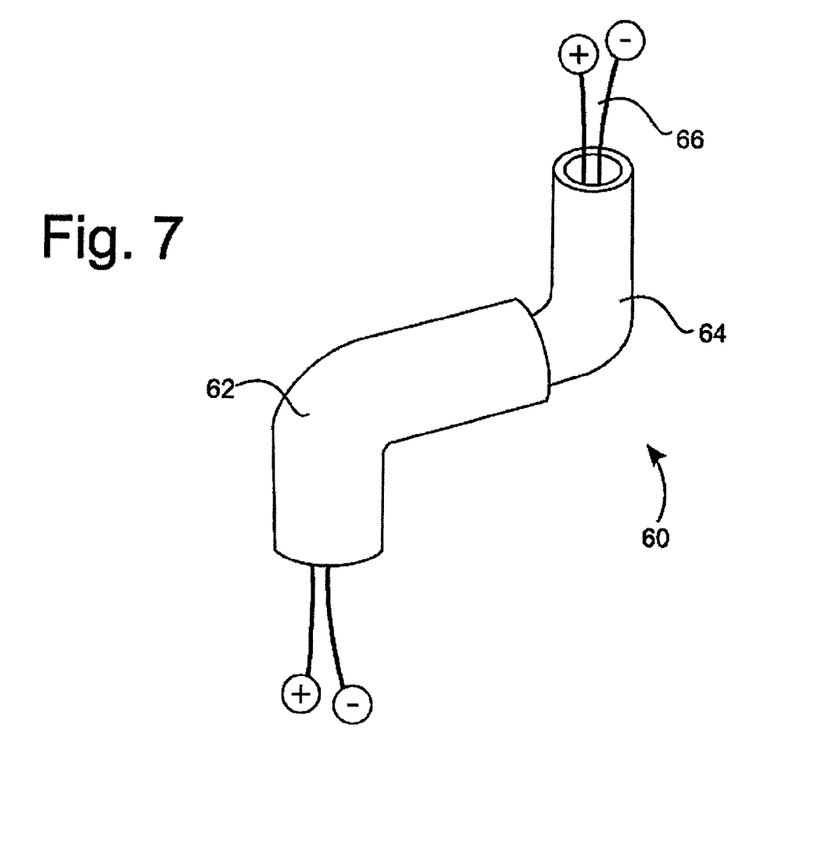
FIG. 7 illustrates an exemplary possibility of including electrical connections into hinge parts.

In some embodiments according to the invention, some or all of the separate device parts may require electrical power for operation. In general, a power supply may be present in the main component of the device, such as a power connector suitable for an external power supply, or a rechargeable or non-rechargeable battery. For providing power to functional elements in attached separated device parts, several options are feasible. For one thing, both/all of the separate and joined device components may have their own independent power supply, e.g. separate batteries which may optionally be rechargeable. However, it would be rather impractical to have two separate power plugs or charging ports for the device parts. Thus, a conventional wire interconnection through one of the inventive joint elements may be provided. As has been shown in the example hinge structures, the inner rods or cylinders may alternatively be hollow. Then, wires 66 for electrical connection may be led through the inner cylinder 52 of e.g. the piston joint of FIG. 6, or the inner cylinder 44, 64 of the cylinder rod structure, as illustrated by FIG. 7. The wires 66 may be provided with detachable connectors on one or both ends.

Other options for power supply include an inductive or capacitive power connection at the inventive hinge elements or as a separate element. In further embodiments, a rechargeable battery in an attached device component may feed the functional elements in this part, and may be recharged in a closed device position by a direct connection between the device components, which may e.g. be obtained by a charging pin which is connected to the main component (and its power supply) in the closed configuration. In other exemplary embodiments, one or more of the device parts may get by without power supply, for example with passive sensors or other passive elements.

Although exemplary embodiments of the present invention have been described, these should not be construed to limit the scope of the appended claims. Those skilled in the art will understand that various modifications may be made to the described embodiments and that numerous other configurations or combinations of any of the embodiments are capable of achieving this same result. Moreover, to those skilled in the various arts, the invention itself will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention.

What is claimed is:

1. A mechanical joint having at least first and second joint elements of the mechanical joint arranged in contact with each other, wherein a first surface of said first joint element abutting a second surface of said second joint element is at least partially provided with at least one optically emitting module, said respective abutting second surface of said second element being provided at least in part with at least one optically receiving module wherein the optically receiving module and the optically emitting module are configured to form an optical data interconnection at the mechanical joint.

2. The joint of claim 1, wherein one of said joint elements is at least partially enfolding the other of said joint elements.

3. The joint of claim 1, wherein said optically emitting module is an organic light emitting diode.

4. The joint of claim 1, wherein said optically receiving module is an organic photodiode.

5. The joint of claim 3, wherein said optically receiving module is a pin-photodiode.

6. The joint of claim 4, wherein said optically emitting module is a vertical cavity surface emitting laser.

7. The joint of claim 1, wherein said first element surface is covered with said optically emitting module at least on any surface region which contacts said second element surface in any relative joint position.

8. The joint of claim 1, wherein said second element surface is covered with said optically receiving module at least on any surface region which contacts said first element surface in any relative joi1nt position.

9. The joint of claim 1, wherein said joint is a ball-and-socket joint.

10. The joint of claim 9, wherein said first element is a ball element and said second element is a socket element enclosing said ball element at least in part.

11. The joint of claim 9, wherein said second element is a ball element and said first element is a socket element enclosing said ball element at least in part.

12. The joint of claim 1, further comprising a lubricant provided between said contact surfaces of said first and second elements.

13. The joint of claim 1, wherein at least a part of said surfaces being covered with optically emitting and/or receiving modules is provided with an optically transparent protective layer.

14. The joint of claim 13, wherein said protective layer is only transparent for the wavelengths emitted by said optically emitting module.

15. The joint of claim 13, wherein said protective layer comprises an acrylic resin coating.

16. The joint of claim 1, said first and second joint elements comprising first and second nested cylindrical elements, wherein said first cylindrical element is an inner element and said second cylindrical element is an outer element.

17. The joint of claim 16, said cylindrical elements each having a connecting rod which extends substantially orthogonal to the cylinder axis.

18. The joint of claim 17, wherein said outer cylindrical element has a partial circumferential opening of at least the width of said connecting rod of said inner element.

19. The joint of claim 16, wherein said first and second cylindrical elements are arranged to allow a piston movement substantially parallel to the cylinder axis.

20. The joint of claim 1, wherein said first and second joint elements are at least partially hollow, and wherein at least one cable is threaded through both of said joint elements.

21. The joint of claim 20, wherein said cable is a detachable electrical connection.

22. The joint of claim 1, wherein said optically emitting module is capable of emitting at least two different wavelengths of light.

23. The joint of claim 22, wherein said Optically emitting module comprises at least two superimposed layers of organic light emitting diodes.

24. The joint of claim 22, wherein said optically receiving module is capable of receiving at least said two different wavelengths of light.

25. The joint of claim 24, wherein said optically receiving module comprises at least two superimposed layers of organic light emitting diodes.

26. The joint of claim 22, wherein said optically emitting module is connected to a wavelength multiplexer.

27. The joint of claim 1, wherein said optically receiving module and/or said optically emitting module comprises a single connected module unit.

28. The joint of claim 1, wherein said optically receiving module and/or said optically emitting module comprises at least two separate module units.

29. The joint of claim 28, further comprising a synchronizer connected to said separate module units for synchronizing optical signals transmitted via said module.

30. A joint module comprising one or more mechanical joints according to claim 1 connected together.

31. The joint module of claim 30 wherein said second element surface is covered with said optically receiving module at least on any surface region which contacts said first element surface in any relative joint position and the joint module further including one or more ball and socket joints.

32. The joint module of claim 31, wherein said joint elements are arranged within a common plane.

33. An electronic device comprising at least two separate parts connected in at least One area, wherein said connection is provided by a mechanical joint according to claim 1.

34. The electronic device of claim 33, comprising at least one of the group of: a mobile communication device, a laptop computer, a personal digital assistant, a. navigation system, a media player.

35. A method comprising;
providing first and second joint elements for allowing a movement of said joint elements relative to each other when arranged together to form a mechanical joint;
wherein a first contact surface of said first joint element at least partially abuts on a second contact surface of said second joint element,
providing said first contact surface of said first joint element at least partially with an optically emitting module; and
providing said second contact surface of said second joint element at least partially with an optically receiving module, wherein the optically receiving module and the optically emitting module are configured to form an optical data interconnection at the mechanical joint.

36. The method of claim 35, wherein said providing of an optically emitting module includes coating said surface with an organic light emitting diode.

37. The method of claim 35, wherein said providing of an optically receiving module includes coating said surface with an organic photodiode.

38. The method of claim 35, further comprising coating at least one of said contact surfaces with a protecting material.

39. The method of claim 38, wherein said protecting material is translucent at least at the wavelength(s) of said optically emitting module.

40. The method of claim 38, wherein said protecting material is an acrylic resin coating.

41. The method of claim 35, further comprising
introducing a lubricant in between said first and second contact surfaces.

42. An apparatus comprising:
a first joint element comprising a first surface and an optically emitting module, wherein the optically emitting module is at the first surface; and
a second joint element configured to he connected to the first joint element, wherein the second joint element comprises a second surface and an optically receiving module, wherein the optically receiving module is at the second surface, and wherein the first joint element and the second joint element are configured to form a mechanical joint;
wherein one of the optically emitting module and the optically receiving module is configured to overlap the other of the optically emitting module and the optically receiving module wherein the optically receiving module and the optically emitting module are configured to form an optical data interconnection at the mechanical joint.

* * * * *